(12) United States Patent
Miguel et al.

(10) Patent No.: US 8,900,406 B2
(45) Date of Patent: Dec. 2, 2014

(54) PROCEDURE FOR OBTAINING NANOFIBRILLATED CELLULOSE FROM RECOVERED PAPER

(71) Applicant: Saica Pack, S.L., Saragossa (ES)

(72) Inventors: Pablo Gonzalez Miguel, Saragossa (ES); Ana Cristina Crespo Miñana, Saragossa (ES); Gemma Ibarz Ric, Saragossa (ES); Susana Gonzalez Alonso, Saragossa (ES); Azucena Gonzalez Alvarez, Saragossa (ES); Alberto Mena Diaz de Corcuera, Saragossa (ES)

(73) Assignee: Saica Pack, S.L., Saragossa (ES)

( * ) Notice: Subject to any disclaimer, the term of this patent is extended or adjusted under 35 U.S.C. 154(b) by 0 days.

(21) Appl. No.: 13/886,684

(22) Filed: May 3, 2013

(65) Prior Publication Data

US 2013/0292070 A1    Nov. 7, 2013

(30) Foreign Application Priority Data

May 3, 2012  (ES) .................................. 201230663

(51) Int. Cl.
*D21B 1/04*  (2006.01)

(52) U.S. Cl.
USPC ................................ 162/27; 162/141; 162/76

(58) Field of Classification Search
USPC .............................. 162/27, 141, 76, 187, 158
See application file for complete search history.

(56) References Cited

U.S. PATENT DOCUMENTS

| 4,483,743 | A | | 11/1984 | Turbak et al. | |
|---|---|---|---|---|---|
| 5,964,983 | A | * | 10/1999 | Dinand et al. .................. | 162/27 |

FOREIGN PATENT DOCUMENTS

| WO | 2010149711 | 12/2010 |
|---|---|---|
| WO | 2011051882 | 5/2011 |
| WO | 2011055148 | 5/2011 |

* cited by examiner

*Primary Examiner* — Mark Halpern
(74) *Attorney, Agent, or Firm* — Albert Bordas, P.A.

(57) ABSTRACT

A procedure for obtaining nanofibrillated cellulose starting from a raw material including recycled or recovered paper, or recovered paper pulp or recovered cellulose comprises the stages of: immersing the raw material in an acetic acid dilution, in a concentration of 10% to 50% by volume, during a time inverse to the concentration of acetic acid; stirring the raw material immersed in the acetic acid dilution; and subsequently subjecting the cellulosic material to a mechanical process of longitudinal separation of fibers, by shear forces applied through a mixer or similar equipment capable of creating enough shearing on cellulose pulp. Thanks to the above procedure nanofibrillated cellulose from recycled paper is obtained with similar features to the nanofibrillated cellulose obtained from virgin cellulose.

6 Claims, No Drawings

PROCEDURE FOR OBTAINING NANOFIBRILLATED CELLULOSE FROM RECOVERED PAPER

FIELD OF THE INVENTION

The present invention relates to procedures for obtaining nanofibrillated cellulose, and more particularly, to obtaining nanofibrillated cellulose from recovered paper.

BACKGROUND OF THE INVENTION

Different documents describing different procedures for obtaining nanofibrillated cellulose are known in the state of the art.

In U.S. Pat. No. 4,483,743, nanofibrillated cellulose is obtained from a liquid suspension of virgin cellulose that is subjected to a warming-up pre-treatment of 50° C. to 80° C., being processed by passing it through a high pressure homogeniser.

WIPO publication WO2011/051882 A1 describes a procedure for obtaining nanofibrillated cellulose obtained from cotton, cereals, hard and soft woods that are subjected to a pre-treatment with enzymes, being processed by a twin-screw extruder.

In WIPO publication WO2010/149711 A2, the raw material from which nanofibrillated cellulose is obtained is recycled white paper, colour paper of different colours or bleached papers, which are subjected to a previous treatment comprising the use of a paper shredder with an interchangeable hammer mill suitable for the preparation of hemp, cereal straw and other lignocellulosic materials, related to the separation of foreign (opposite) material (wood, metal, stone, plastics, etc.) and a cleaning system, including the elimination of powder.

Finally, WIPO publication WO2011/055148 describes an apparatus and a method for processing cellulose fibres, which leaves the source of cellulosic material very open, not using just paper, using some pre-treatments similar to those from the above patent.

However, none of the above patents describes a procedure for obtaining nanofibrillated cellulose starting from recovered paper, obtaining nanofibrillated cellulose having similar features to that obtained from virgin cellulose.

SUMMARY OF THE INVENTION

In view of the foregoing, it is an object of the present invention to develop a procedure for obtaining nanofibrillated cellulose that, starting from recycled material (e.g., recovered paper, or recovered paper pulp or recovered cellulose), obtains cellulose with similar features to that obtained from virgin cellulose.

The present invention is characterised by both the starting raw material and the technical features of some of the stages, such that the overall features allow obtaining nanofibrillated cellulose from recovered paper.

The distinguishing feature with respect to the state of the art, is not just the fact of starting from recovered paper, or from recovered paper pulp or from recovered cellulose, but also the stages that said raw material has had to be subjected to in order to obtain nanofibrillated cellulose with similar features to that obtained from virgin cellulose.

For that purpose, the raw material undergoes a procedure comprising a chemical pre-treatment stage, and a second mechanical treatment stage.

The chemical pre-treatment stage has two objectives, on the one hand the weakening of cellulose fibre and, on the other hand, the elimination of inorganic fillers that can act as promoters of agglomeration of fibres, i.e., purification is undertaken by removing mineral fillers without attacking the fibres through the elimination of carbonates, among other mineral fillers.

Among all the products tested and sought it is believed that the product that cleans all the fibres of the original cellulosic material of most of the mineral filler is acetic acid, the raw material being immersed in an acetic acid dilution for a while and subjected to a stirring process.

The second stage consists of a mechanical treatment in which some shear forces are applied in order to longitudinally and completely separate the cellulose fibres already weakened in the previous step.

The application of shear forces for longitudinally separating the fibres can take place through a mixer or similar equipment for creating enough shearing on the cellulose pulp.

According to an embodiment of the present invention, a procedure for obtaining nanofibrillated cellulose, starting from a raw material including recycled or recovered paper or recovered paper pulp or recovered cellulose, comprises the following stages:

1) immersing the raw material in an acetic acid dilution.
2) stirring the raw material immersed in the acetic acid dilution.
3) subjecting the cellulosic material to a mechanical process of separating already weakened cellulose fibres.

These and other objects, aspects and advantages of the present invention will be better appreciated in view of the following detailed description of preferred embodiments.

DETAILED DESCRIPTION OF PREFERRED EMBODIMENTS

For a preferred embodiment of the invention, the acetic acid dilution in which the raw material (recovered paper, or recovered paper pulp or recovered cellulose pulp) is immersed will be a 10% to 50% by volume dilution, and even lower or higher dilutions can be used, depending on the time the raw material is immersed in the dilution. The lower the dilution, the higher the immersion time, and vice versa.

The time the raw material remains immersed in the acetic acid dilution will be inverse to the concentration of acetic acid in the dilution, noting just as a reference and not a limiting value that, for a 35% by volume acetic acid dilution, the suitable time of immersion for the raw material will be approximately 20 minutes.

The acetic acid dilution in which the raw material is immersed and the time required are not necessarily limiting, and can readily be adjusted according to convenience and taking into account the inverse relation of the two. More preferred values for a particular process can be determined after characterising the cellulose obtained by analysing the physical-chemical features.

Regarding the mechanical processing for the longitudinal separation of fibres, it can take place through the application of shear forces, which in turn can be applied, among other methods, by means of a mixer or similar equipment capable of creating enough shearing on cellulose pulp. The speed of the mixer will be in the range of 20 to 600 revolutions per minute (RPM).

The obtained pulp humidity will be in the range of 30% to 50%, while the temperature at which the process is performed will be from 25° C. to 95° C.

Sufficiently described the nature of the present invention, as well as how to put it into practice, it is noted that, within its essence, it may be brought to the practice in other embodiments that differ in detail from the one shown by way of example, and which will also reach the protection that is sought, provided that its fundamental principle is not altered, changed or modified.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A procedure for obtaining nanofibrillated cellulose starting from recycled or recovered paper or recovered paper pulp raw material, the procedure comprising:
   a) immersing the raw material in an acetic acid dilution in a concentration range of 10% to 50%;
   b) stirring the raw material immersed in the acetic acid dilution; and
   c) subjecting the cellulosic material to a mechanical process of longitudinal separation of the fibres that takes place through the application of shear forces.

2. The procedure for obtaining nanofibrillated cellulose according to claim 1, wherein a time that the raw material remains in the acetic acid dilution is inverse to a concentration of acetic acid in the dilution, such that the lower the concentration of acetic acid in the dilution, the higher the immersion time, and vice versa.

3. The procedure for obtaining nanofibrillated cellulose according to claim 1, wherein the shear forces are applied by a mixer or other equipment capable of creating enough shearing on the cellulose pulp.

4. The procedure for obtaining nanofibrillated cellulose according to claim 3, wherein the shear forces are applied by the mixer operating at a speed in the range of 20 to 600 revolutions per minute (RPM).

5. A procedure for obtaining nanofibrillated cellulose starting from recycled raw material, the procedure comprising:
   immersing the raw material in an acetic acid dilution so as to weaken cellulose fibres while removing inorganic fillers from the cellulose fibres without attacking the cellulose fibres;
   stirring the raw material immersed in the acetic acid dilution; and
   longitudinally separating the weakened cellulose fibres by applying shear forces thereto.

6. The procedure of claim 5, wherein a mixer is used to apply the shear forces to the weakened fibres.

* * * * *